United States Patent
Nagaoka et al.

(10) Patent No.: US 11,004,609 B2
(45) Date of Patent: May 11, 2021

(54) MULTILAYER CERAMIC CAPACITOR HAVING CERTAIN INTERLAYER INSULATION RESISTANCE

(71) Applicant: TAIYO YUDEN CO., LTD., Tokyo (JP)

(72) Inventors: Kunihiko Nagaoka, Takasaki (JP); Noriyuki Chigira, Takasaki (JP); Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 119 days.

(21) Appl. No.: 16/250,848

(22) Filed: Jan. 17, 2019

(65) Prior Publication Data

US 2019/0237262 A1  Aug. 1, 2019

(30) Foreign Application Priority Data

Jan. 26, 2018  (JP) .............................. JP2018-011567

(51) Int. Cl.
  *H01G 4/30* (2006.01)
  *H01G 4/12* (2006.01)
  *H01G 4/008* (2006.01)

(52) U.S. Cl.
  CPC ............... *H01G 4/30* (2013.01); *H01G 4/008* (2013.01); *H01G 4/1227* (2013.01)

(58) Field of Classification Search
  CPC ......... H01G 4/30; H01G 4/1227; H01G 4/008
  See application file for complete search history.

(56) References Cited

U.S. PATENT DOCUMENTS

| | | | |
|---|---|---|---|
| 2003/0142463 A1* | 7/2003 | Nakamura | B32B 18/00 361/321.2 |
| 2009/0086407 A1* | 4/2009 | Takahashi | H01G 4/1227 361/321.5 |
| 2009/0135545 A1* | 5/2009 | Thomas | H01G 4/005 361/305 |
| 2013/0286541 A1* | 10/2013 | Kawamoto | H01C 7/10 361/321.4 |

(Continued)

FOREIGN PATENT DOCUMENTS

| | | | |
|---|---|---|---|
| JP | 2007095382 A | * | 4/2007 |
| JP | 2015038032 A | | 2/2015 |

(Continued)

*Primary Examiner* — David M Sinclair
(74) *Attorney, Agent, or Firm* — Law Office of Katsuhiro Arai

(57) ABSTRACT

A multilayer ceramic capacitor includes: a ceramic multilayer structure having a structure in which each of a plurality of ceramic dielectric layers and each of a plurality of internal electrode layers are alternately stacked and are alternately exposed to two edge faces of the ceramic multilayer structure; and a pair of external electrodes that are formed on the two edge faces, wherein when an average value of insulation resistances of each pair of the internal electrode adjacent to each other in a stacking direction is $IR_{ave}$ and a minimum value of the insulation resistances is $IR_{min}$, $(IR_{ave}-IR_{min})/IR_{ave}<0.50$ is satisfied.

4 Claims, 3 Drawing Sheets

(56) References Cited

U.S. PATENT DOCUMENTS

| | | | |
|---|---|---|---|
| 2014/0009864 A1* | 1/2014 | Takashima | C04B 35/4682 |
| | | | 361/301.4 |
| 2015/0036262 A1 | 2/2015 | Kai et al. | |
| 2016/0189865 A1 | 6/2016 | Kawamura et al. | |
| 2016/0217924 A1 | 7/2016 | Morita et al. | |
| 2017/0025222 A1 | 1/2017 | Park et al. | |
| 2017/0365410 A1* | 12/2017 | Morita | H01G 4/0085 |

FOREIGN PATENT DOCUMENTS

| JP | 2015046589 A | 3/2015 |
|---|---|---|
| JP | 2016127120 A | 7/2016 |
| JP | 2016139720 A | 8/2016 |
| JP | 2017028246 A | 2/2017 |

* cited by examiner

MULTILAYER CERAMIC CAPACITOR HAVING CERTAIN INTERLAYER INSULATION RESISTANCE

CROSS-REFERENCE TO RELATED APPLICATION

This application is based upon and claims the benefit of priority of the prior Japanese Patent Application No. 2018-011567, filed on Jan. 26, 2018, the entire contents of which are incorporated herein by reference.

FIELD

A certain aspect of the present invention relates to a multilayer ceramic capacitor.

BACKGROUND

With respect to multilayer ceramic capacitors having a small size and large capacity, reduction of a thickness of a dielectric layer and increase of the number of the dielectric layer are required in order to enlarge the capacity. And so, there is disclosed a technology for achieving sufficient insulating characteristic (for example, see Japanese Patent Application Publication No. 2015-38032, Japanese Patent Application Publication No. 2015-46589 and Japanese Patent Application Publication No. 2017-28246).

SUMMARY OF THE INVENTION

However, the insulating characteristic may be degraded when variation of an IR (Insulation Resistance) value of each dielectric layer gets larger as the thickness of the dielectric layer is reduced.

The present invention has a purpose of providing a multilayer ceramic capacitor that is capable of improving insulation characteristic.

According to an aspect of the present invention, there is provided a multilayer ceramic capacitor including: a ceramic multilayer structure having a structure in which each of a plurality of ceramic dielectric layers and each of a plurality of internal electrode layers are alternately stacked and are alternately exposed to two edge faces of the ceramic multilayer structure; and a pair of external electrodes that are formed on the two edge faces, wherein when an average value of insulation resistances of each pair of the internal electrode adjacent to each other in a stacking direction is $IR_{ave}$ and a minimum value of the insulation resistances is $IR_{min}$, $(IR_{ave}-IR_{min})/IR_{ave}<0.50$ is satisfied.

DETAILED DESCRIPTION

A description will be given of an embodiment with reference to the accompanying drawings.

Embodiment

Figure 1:
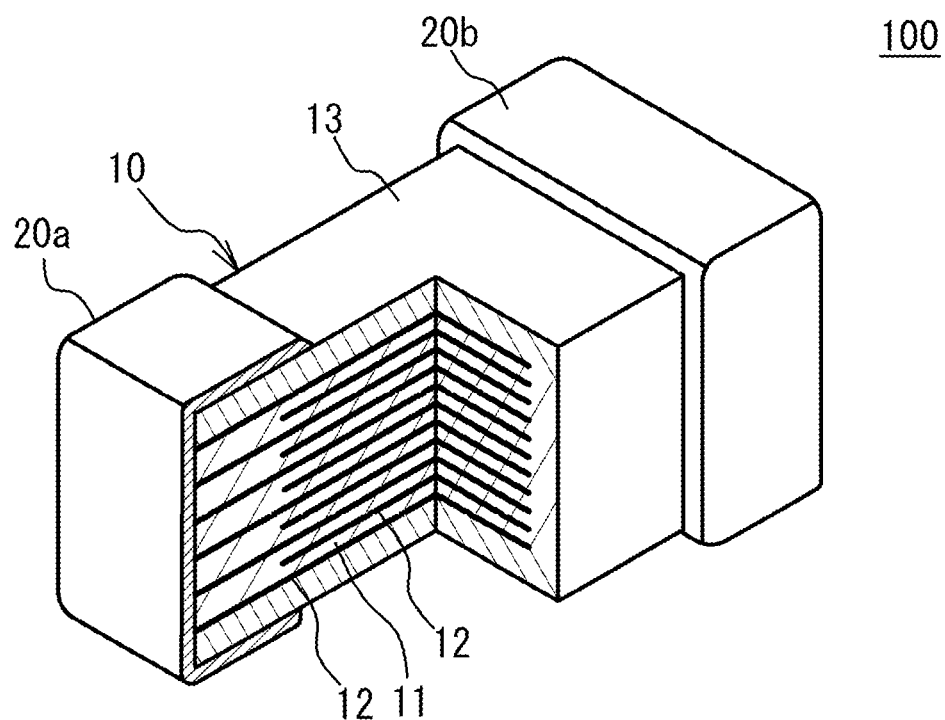
FIG. 1 illustrates a partial perspective view of a multilayer ceramic capacitor in accordance with an embodiment.

A description will be given of a multilayer ceramic capacitor. FIG. 1 illustrates a partial perspective view of a multilayer ceramic capacitor 100 in accordance with an embodiment. As illustrated in FIG. 1, the multilayer ceramic capacitor 100 includes a multilayer chip (ceramic main body) 10 having a rectangular parallelepiped shape, and a pair of external electrodes 20a and 20b that are respectively provided at two edge faces of the multilayer chip 10 facing each other. Four faces of the multilayer chip 10 other than the two edge faces are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In the multilayer chip 10, cover layers 13 cover two side faces corresponding to an upper face and a lower face of the multilayer chip 10 in a stacking direction of the dielectric layer 11 and the internal electrode layer 12 (hereinafter referred to as a stacking direction). A main component of the cover layer 13 is a ceramic material. For example, a main component material of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

In the multilayer ceramic capacitor 100, the insulation characteristic of the multilayer ceramic capacitor 100 is determined in accordance with an insulation resistance between a pair of the internal electrode layers 12 that are next to each other in the stacking direction (referred to as an interlayer resistance). The present inventors discover that the insulation characteristic of the multilayer ceramic capacitor 100 is not determined in accordance with an average of each interlayer resistance but is determined in accordance with the variation of resistance values of each interlayer resistance. In concrete, the present inventors discover that the insulation characteristic of the multilayer ceramic capacitor 100 is degraded when the variation of each interlayer resistance is large and a minimum value of each interlayer resistance is small. On the basis of the knowledge, even if the average value of each interlayer resistance is large, the insulation characteristic of the multilayer ceramic capacitor 100 is degraded when the minimum value of each interlayer resistance is small. In concrete, a BDV (Breakdown Voltage) is reduced and reliability such as life characteristic is degraded. And so, in the embodiment, when the average of each interlayer resistance is $IR_{ave}$ and the minimum value of each interlayer resistance is $IR_{min}$, the following formula $(IR_{ave}-IR_{min})/IR_{ave}<0.50$ is satisfied. With the structure, the variation of each interlayer resistance is small, the BDV of the multilayer ceramic capacitor 100 is improved, and the reliability is improved. That is, the insulation characteristic of the multilayer ceramic capacitor 100 is improved. It is preferable that $(IR_{ave}-IR_{min})/IR_{ave}<0.40$ is satisfied, from a viewpoint of reduction of the variation of each interlayer resistance. It is more preferable that $(IR_{ave}-IR_{min})/IR_{ave}<0.35$ is satisfied.

A description will be given of degradation of insulation characteristic, caused by the oxygen defect. For example, the dielectric layers 11 are formed by firing material powders of which a main component is perovskite expressed by a general chemical formula $ABO_3$. During the firing, the material powders are exposed to reductive atmosphere. Therefore, the oxygen defect may occur in $ABO_3$. When the multilayer ceramic capacitor 100 is used, a voltage is repeatedly applied to the dielectric layers 11. In this case, the oxygen defect moves in the dielectric layers 11. Thus, barrier is broken. That is, the oxygen defect causes the variation of the interlayer resistance and the degradation of the insulating characteristic.

And so, it is preferable that a B site of the perovskite structure includes an element acting as a donor. That is, it is preferable that the element acting as the donor is substitutionally solid-solved in the B site. For example, the element acting as the donor is such as Mo (molybdenum), Nb (niobium), Ta (tantalum), W (tungsten) or the like. When the element acting as the donor is substitutionally solid-solved in the B site, the oxygen defect in the perovskite is suppressed. Thus, the variation of the interlayer insulating resistance is suppressed. It is therefore possible to improve the insulation characteristic.

In the B site, an amount of the element acting as the donor is excessively small, it may not be necessarily possible to sufficiently suppress oxygen defect. And so, it is preferable that an amount of the element that acts as the donor and is substitutionally solid-solved in the B site has a lower limit. For example, it is preferable that the amount of the element that acts as the donor and is subsitutionally solid-solved in the B site is 0.05 atm % or more on a presumption that an amount of a main component element of the B site (Ti in $BaTiO_3$) is 100 atm %. It is more preferable that the amount is 0.10 atm % or more.

On the other hand, when the amount of the element acting as the donor is excessively large in the B site, defects such as decrease of insulation resistance of the multilayer ceramic capacitor 100 may occur. And so, it is preferable that the amount of the element that acts as the donor and is substitutionally solid-solved in the B site has an upper limit. For example, it is preferable that the amount of the element that acts as the donor and is substituotionally solid-solved in the B site is 0.3 atm % or less. It is more preferable that the amount is 0.25 atm % or less.

When a ratio of the main component element of the A site/the main component element of the B site (Ba/Ti in $BaTiO_3$) is excessively small, abnormal grain growth may occur in the ceramic material acting as the main component of the dielectric layers 11. In this case, variation of the number of the crystal grain boundaries may occur in the dielectric layers 11. Thus, variation may occur in the interlayer insulating resistances. And so, it is preferable that the ratio of the main component element of the A site/the main component element of the B site has a lower limit. In concrete, it is preferable that the ratio of the main component element of the A site/the main component element of the B site is equal to or more than 1.001. On the other hand, when the ratio of the main component element of the A site/the main component element of the B site is excessively large, a defect such as degradation of the relative dielectric constant may occur. And so, it is preferable that the ratio of the main component element of the A site/the main component element of the B site has an upper limit. In concrete, it is preferable that the ratio of the main component element of the A site/the main component element of the B site is equal to or less than 1.020.

When the thickness of the dielectric layers 11 is enlarged, preferable insulation characteristic may be achieved. However, in this case, the capacity of the multilayer ceramic capacitor 100 may be reduced. Therefore, the embodiment has large effect with respect to the multilayer ceramic capacitor 100 that has thin dielectric layers and has large capacity. For example, the embodiment has large effect with respect to a multilayer ceramic capacitor in which the thickness of the dielectric layers 11 is 1 μm or less.

Figure 2:
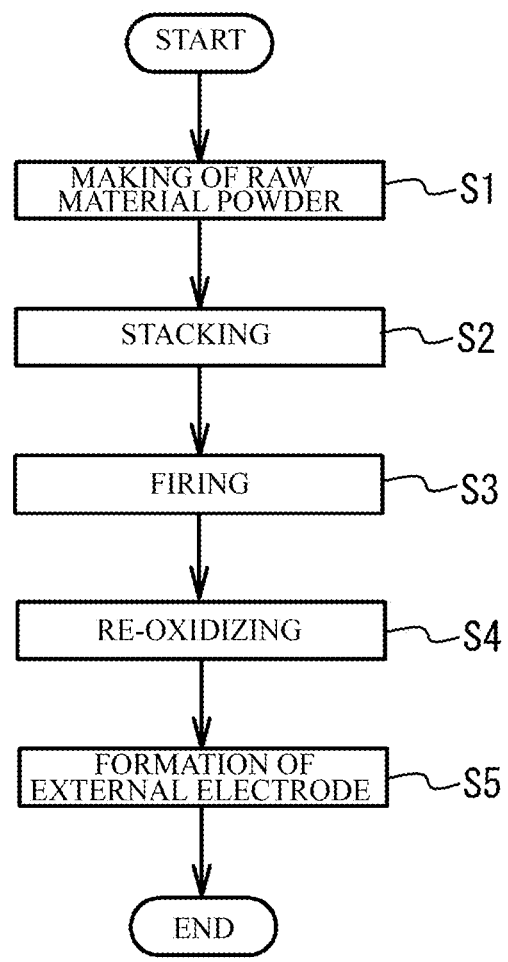
FIG. 2 illustrates a manufacturing method of a multilayer ceramic capacitor.

Next, a description will be given of a manufacturing method of the multilayer ceramic capacitor 100. FIG. 2 illustrates a manufacturing method of the multilayer ceramic capacitor 100.

(Making process of a raw material powder) Ceramic powders are prepared. A main component of the ceramic powders is a ceramic material of which a main phase has a perovskite structure expressed by a general formula $ABO_3$. When the element acting as the donor is substitutionally solid-solved in the B site, the element is substitutionally solid-solved in the ceramic powders in advance. For example, molybdenum oxide ($Mo_2O_3$) is blended with a slight amount of pure water and is added to slurry in which $TiO_2$, $BaCO_3$ and dispersant are mixed, when Mo is substitutionally solid-solved in the B site of $BaTiO_3$. After that, the resulting slurry is stirred. Thus, slurry in which Mo is solved is obtained. $TiO_2$ and $BaCO_3$ are dispersed so that a desirable diameter of $BaTiO_3$ and desirable quality of $BaTiO_3$ are achieved. Viscosity of the slurry is enlarged on the basis of a mixing degree of unadsorbed dispersant and a solid component. The resulting slurry is dried. Thus, a green material is obtained. After that, the green material is calcined at 950 degrees C. or the like. Thus, $BaTiO_3$ in which Mo is substitutionally solid-solved in the B site is obtained. When the ratio of the main component element of the A site/the main component element of the B site is 1.001 or more in the perovskite structure of the ceramic powders, grain growth in a firing process described later can be suppressed.

Additive compound may be added to the resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B, Na (sodium), K (potassium) and Si, or glass.

For example, compound including the additive compound is mixed with the ceramic powders. The resulting ceramic powders are calcined in a temperature range of 820 degrees C. to 1150 degrees C. Then, the ceramic powders are wet-blended with the additive compound. After that, the ceramic powders with the additive compound are dried and crushed. And, desirable ceramic powders are prepared. For example, it is preferable that an average grain diameter of the ceramic powders is 50 nm to 150 nm, from a viewpoint of thickness reduction of the dielectric layers 11. For example, the resulting ceramic powders may be crushed and a grain diameter of the ceramic powders may be adjusted if necessary. Alternatively, the grain diameter may be adjusted by combining a classification process. With the processes, the dielectric material is obtained.

(Stacking Process) Next, a binder such as polyvinyl butyral (PVB) resin, an organic solvent such as ethanol or toluene, and a plasticizer are added to the resulting dielectric material and are wet-blended. With use of the resulting slurry, a strip-shaped dielectric green sheet with a thickness of 3 µm to 10 µm is coated on a base material by, for example, a die coater method or a doctor blade method, and then dried.

Then, a pattern of the internal electrode layer 12 is provided on the surface of the dielectric green sheet by printing a metal conductive paste including an organic binder with use of screen printing or gravure printing. A plurality of the patterns are alternately extracted to the pair of external electrodes. The metal conductive paste includes a ceramic grain acting as a co-material. The main component of the ceramic grain is not limited. It is preferable that the main component is the same as the main component ceramic of the dielectric layers 11. For example, $BaTiO_3$ having an average grain diameter of 50 nm or less may be evenly dispersed.

Then, the pattern-formed sheet is stamped into a predetermined size, and a predetermined number (for example, 100 to 500) of stamped pattern-formed sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked pattern-formed sheets and under the stacked sheets and are thermally compressed. The resulting compact is cut into a predetermined size (for example, 1.0 mm×0.5 mm).

In $N_2$ atmosphere, the binder is removed from the resulting ceramic multilayer structure. After that, metal paste that includes a metal filler including the main component metal of the external electrodes 20a and 20b, a co-material, a binder, a solvent and so on and is to be a ground layer of the external electrodes 20a and 20b is coated from the both edge faces of the ceramic multilayer structure to each side face and is dried.

(Firing process) After that, the binder is removed from the ceramic multilayer structure in $N_2$ atmosphere of 250 degrees C. to 500 degrees C. The resulting ceramic multilayer is fired for 10 minutes to 2 hours in a reductive atmosphere of which an oxygen partial pressure is $10^{-5}$ to $10^{-8}$ atm in a temperature range of 1100 degrees C. to 1300 degrees C. Thus, each compound structuring the dielectric green sheet is sintered and grown. In this manner, a compact is obtained. The reductive atmosphere is mixed gas of $N_2$ gas and $H_2$ gas. It is preferable that a concentration of $H_2$ is larger than 0% and 0.2% or less. This is because the grain growth can be suppressed when the concentration of $H_2$ is regulated.

(Re-oxidizing process) After that, the sintered structure may be subjected to a re-oxidizing process in $N_2$ gas atmosphere in a temperature range of 600 degrees C. to 1000 degrees C. Through the process, the oxygen defect is suppressed.

(Forming of external electrodes) After that, with a plating process, a metal layer is formed on the ground layer of the external electrodes 20a and 20b. The metal layer is such as Cu, Ni, Sn or the like. Thus, the multilayer ceramic capacitor 100 is manufactured.

In the manufacturing method, it is possible to suppress the variation of each interlayer resistance. For example, as mentioned above, it is possible to satisfy the formula $IR_{ave}-IR_{min})/IR_{ave}<0.50$, when at least one of the methods is used, the methods including: that the element acting as the donor is substitutionally solid-solved in the B site; that a ratio of the main element of the A site/the main element of the B site is regulated; and that the reductive atmosphere in the firing process is regulated.

EXAMPLES

The multilayer ceramic capacitors in accordance with the embodiment were made and the property was measured.

Molybdenum oxide ($Mo_2O_3$) was blended with a slight amount of pure water and was added to slurry in which $TiO_2$, $BaCO_3$ and dispersant were mixed. After that, the resulting slurry was stirred. Thus, slurry in which Mo was solved was obtained. $TiO_2$ and $BaCO_3$ were dispersed so that a desirable diameter of $BaTiO_3$ and desirable quality of $BaTiO_3$ were achieved. Viscosity of the slurry was enlarged on the basis of a mixing degree of unadsorbed dispersant and a solid component. The resulting slurry was dried. Thus, a green material was obtained. After that, the green material was calcined at approximately 950 degrees C. Thus, $BaTiO_3$ in which Mo was substitutionally solid-solved was obtained. A diameter of the obtained $BaTiO_3$ was approximately 0.15 µm.

In examples 1 to 3, 0.2 atm % of Mo was substitutionally solid-solved on a presumption that the amount of Ti was 100 atm %. In an example 4, 0.1 atm % of Mo was substitutionally solid-solved on a presumption that the amount of Ti was 100 atm %. In comparative examples 1 and 2, Mo was not substitutioally solid-solved. In the example 1, a molar ratio of Ba and Ti (Ba/Ti ratio) was 1.0015. In the example 2, the molar ratio of Ba and Ti was 1.0011. In the example 3, the molar ratio of Ba and Ti was 1.0018. In the example 4, the molar ratio of Ba and Ti was 1.0013. In the comparative example 1, the molar ratio of Ba and Ti was 0.9980. In the comparative example 2, the molar ratio of Ba and Ti was 1.0017.

In the examples 1 to 4, a rare earth oxide, $MnCO_3$, $V_2O_5$ and $SiO_2$ were added to resulting $BaTiO_3$, as the additive compound. In the comparative examples 1 and 2, a rare earth oxide, MgO, $MnCO_3$, $V_2O_5$ and $SiO_2$ were added to the resulting $BaTiO_3$, as the additive compound.

An organic solvent was added to the resulting $BaTiO_3$ and slurry was obtained. The slurry was dried. After that, the dried slurry was crushed by a bead mill until a BET specific surface area becomes 12 m²/g. A PVB binder was added to the slurry and was kneaded. After that, the resulting slurry was coated on a PET film and was dried. Thereby, a dielectric green sheet having a thickness of 1 µm was formed. Next, an internal electrode pattern was formed on the dielectric green sheet by a screen printing of a paste of which a main component was nickel having a primary diameter of approximately 0.1 µm. A plurality of pattern formation sheets were stacked. Pressure bonding was performed with respect to the stacked structure. The resulting stacked structure was cut into a predetermined size. Barreling was performed with respect to the resulting stacked structure. And, external electrodes were coated on the resulting stacked structure. And, a multilayer chip having a size (length: 0.6 mm, width: 0.3 mm, height: 0.3 mm) and has 300 layers was obtained.

Next, the binder was removed from the ceramic multilayer structure in $N_2$ gas atmosphere at approximately 400 degrees C. After that, the resulting ceramic multilayer structure was fired in mixed gas atmosphere of $N_2$ gas and $H_2$ gas at approximately 1200 degrees C. In the example 1, a $H_2$ concentration in the mixed gas atmosphere was 0.05%. In the example 2, the $H_2$ concentration in the mixed gas atmosphere was 0.10%. In the example 3, the $H_2$ concentration in the mixed gas atmosphere was 0.15%. In the example 4, the $H_2$ concentration in the mixed gas atmosphere was 0.05%. In the comparative example 1, the $H_2$ concentration in the mixed gas atmosphere was 0.05%. In the comparative example 2, the $H_2$ concentration in the mixed gas atmosphere was 0.60%. After that, the resulting ceramic multilayer structure was subjected to the re-oxidizing process at approximately 900 degrees C. in $N_2$ atmosphere and the multilayer ceramic capacitor 100 was obtained.

Figure 3:
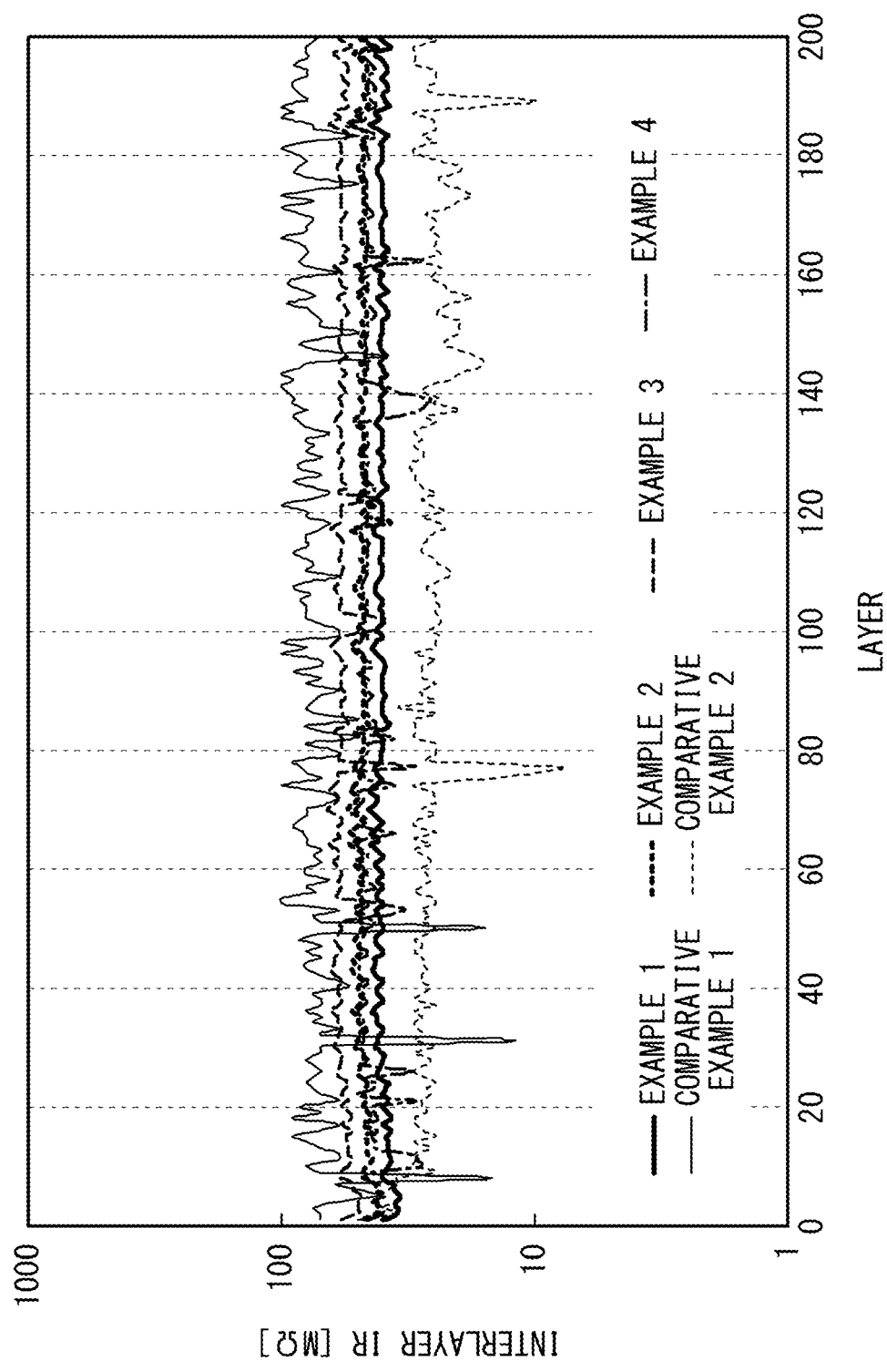
FIG. 3 illustrates measured result of each interlayer resistance.

(Analysis) Each interlayer resistance of the multilayer ceramic capacitor 100 was measured. FIG. 3 illustrates measured result of each interlayer resistance. In FIG. 3, a horizontal axis indicates a position (multilayer number) of the dielectric layers 11 in the stacking direction of the multilayer chip 10. A vertical axis indicates each interlayer resistance.

An average value $IR_{ave}$ of the interlayer resistance, a minimum value $IR_{min}$ of the interlayer resistance and a maximum value $IR_{max}$ of the interlayer insulating resistance were calculated with respect to the examples 1 to 4 and the comparative examples 1 and 2. And, $(IR_{ave}-IR_{min})/IR_{ave}$ was calculated. Table 1 shows the calculated results. As shown in Table 1, $(IR_{ave}-IR_{rmin})/IR_{ave}$ was 0.250 in the example 1, 0.332 in the example 2, 0.473 in the example 3, 0.422 in the example 4, 0.842 in the comparative example 1 and 0.681 in the comparative example 2.

From the results of Table 1, $(IR_{ave}-IR_{min})/IR_{ave}$ was less than 0.50 in any of the examples 1 to 4. On the other hand, $(IR_{ave}-IR_{min})/IR_{ave}$ was equal to or more than 0.50 in the comparative examples 1 and 2. For example, in the comparative example 1, it is thought that factors was that Mo was not substitutionally solid solved, that the molar ratio of Ba and Ti was less than 1.001, or the like. For example, in the comparative example 2, it is thought that factors was that Mo was not substitutionally solid solved, the $H_2$ concentration in the atmosphere in the firing process was more than 0.2%, or the like.

Next, an average grain diameter (an average crystal grain diameter in the dielectric layer 11) and a BDV were measured with respect to the multilayer ceramic capacitors 100 of the examples 1 to 4 and the comparative examples 1 and 2. And a high temperature load test was performed with respect to the multilayer ceramic capacitors 100 of the examples 1 to 4 and the comparative examples 1 and 2. A magnification of a scanning electron microscope or a transmission electron microscope was adjusted so that 80 to 150 numbers of grains are included in a single field. A plurality of images are taken so that total number of the grains of the plurality of images is 400 or more. And, as a grain diameter, a Feret diameter of the all foundable grains in the images was measured. A value obtained by dividing the total value of the measured grain diameters by the number of the measured grain number was an average grain diameter. In the measuring of the BDV, a direct current voltage was applied between the external electrode 20a and the external electrode 20b, and a speed of voltage increase was 75 seconds/1 kV. And, a voltage at which a sample was broken down was the withstand voltage BDV. The BDVs of twenty samples of each of the examples 1 to 4 and the comparative examples 1 and 2 were measured. In the high temperature load test (HALT: Highly Accelerated Limit Test), a direct current voltage of 10V was applied under a high temperature condition of 85 degrees C. A sample of which a time to insulation breakdown was 1000 hours or more was determined as OK. A sample of which a time to insulation breakdown was less than 1000 hours was determined as NG. The number of the samples determined as NG was measured. The high temperature load test was performed with respect to 400 samples of each of the examples 1 to 4 and the comparative examples 1 and 2.

Table 2 shows a measured result. As shown in Table 2, in the example 1, an average grain diameter was 0.171 µm. In the example 2, the average grain diameter was 0.182 µm. In the example 3, the average grain diameter was 0.199 µm. In the example 4, the average grain diameter was 0.168 µm. In the comparative example 1, the average grain diameter was 0.176 µm. In the comparative example 2, the average grain diameter was 0.289 µm.

TABLE 1

| | Mo atm % | $H_2$ (%) | Ba/Ti RATIO | $IR_{ave}$ (MΩ) | $IR_{max}$ (MΩ) | $IR_{min}$ (MΩ) | $(IR_{ave} - IR_{min})/IR_{ave}$ |
|---|---|---|---|---|---|---|---|
| EXAMPLE 1 | 0.2 | 0.05 | 1.0015 | 40.0 | 46 | 30 | 0.250 |
| EXAMPLE 2 | 0.2 | 0.10 | 1.0011 | 47.9 | 55 | 32 | 0.332 |
| EXAMPLE 3 | 0.2 | 0.15 | 1.0018 | 56.9 | 66 | 30 | 0.473 |
| EXAMPLE 4 | 0.1 | 0.05 | 1.0013 | 45.0 | 57 | 26 | 0.422 |
| COMPARATIVE EXAMPLE 1 | 0.0 | 0.05 | 0.9980 | 76.0 | 120 | 12 | 0.842 |
| COMPARATIVE EXAMPLE 2 | 0.0 | 0.60 | 1.0017 | 25.1 | 50 | 8 | 0.681 |

TABLE 2

| | AVERAGE GRAIN DIAMETER (µm) | BDV(V) n = 20 | NG NUMBER OF HIGH TEMPERATURE LOAD TEST |
|---|---|---|---|
| EXAMPLE 1 | 0.171 | 71 | 0/400 |
| EXAMPLE 2 | 0.182 | 66 | 0/400 |
| EXAMPLE 3 | 0.199 | 59 | 0/400 |
| EXAMPLE 4 | 0.168 | 46 | 0/400 |
| COMPARATIVE EXAMPLE 1 | 0.176 | 31 | 3/400 |
| COMPARATIVE EXAMPLE 2 | 0.289 | 37 | 2/400 |

In any of the examples 1 to 4, the BDV was 40 V or more. In any of the examples 1 to 4, the number of NG in the high temperature load test was zero and preferable reliability was achieved. It is thought that this was because $(IR_{ave}-IR_{min})/IR_{ave}$ was less than 0.50, the variation of interlayer resistance was small and the insulation characteristic of the multilayer ceramic capacitor 100 was improved. On the other hand, in any of the comparative examples 1 and 2, the BDV was less than 40 V. And there were some samples determined as NG in the high temperature load test. It is thought that this was because $(IR_{ave}-IR_{min})/IR_{ave}$ was equal to 0.50 or more, the variation of the interlayer resistance was large and the insulation characteristic of the multilayer ceramic capacitor 100 was degraded.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a ceramic multilayer structure having a structure in which each of a plurality of ceramic dielectric layers and each of a plurality of internal electrode layers are alternately stacked and are alternately exposed to two edge faces of the ceramic multilayer structure; and
   a pair of external electrodes that are formed on the two edge faces,
   wherein when an average value of insulation resistances, each insulation resistance being measured for each pair of the internal electrode layers adjacent to each other in a stacking direction, is $IR_{ave}$ and a minimum value of the insulation resistances is $IR_{min}$, $(IR_{ave}-IR_{min})/IR_{ave}<0.50$ is satisfied.

2. The multilayer ceramic capacitor as claimed in claim 1, wherein:
   the ceramic dielectric layers include a ceramic grain including Ba, Ti and Mo; and
   a Mo concentration is 0.05 atm % or more and 0.3 atm % or less on a presumption that an amount of Ti in the ceramic grain is 100 atm %.

3. The multilayer ceramic capacitor as claimed in claim 2, wherein a ratio of Ba/Ti is 1.001 or more in the ceramic dielectric layers.

4. The multilayer ceramic capacitor as claimed in claim 1, wherein an average thickness of the ceramic dielectric layers is 1 μm or less.

* * * * *